United States Patent
Stählin

(10) Patent No.: US 9,373,041 B2
(45) Date of Patent: Jun. 21, 2016

(54) DISTANCE MEASUREMENT BY MEANS OF A CAMERA SENSOR

(75) Inventor: Ulrich Stählin, Eschborn (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 289 days.

(21) Appl. No.: 14/116,907

(22) PCT Filed: May 7, 2012

(86) PCT No.: PCT/EP2012/058354
§ 371 (c)(1),
(2), (4) Date: Dec. 5, 2013

(87) PCT Pub. No.: WO2012/152746
PCT Pub. Date: Nov. 15, 2012

(65) Prior Publication Data
US 2014/0085428 A1    Mar. 27, 2014

(30) Foreign Application Priority Data
May 11, 2011 (DE) .......................... 10 2011 075 674

(51) Int. Cl.
| | |
|---|---|
| *H04N 9/47* | (2006.01) |
| *G06K 9/00* | (2006.01) |
| *G01C 3/06* | (2006.01) |
| *G06T 7/00* | (2006.01) |
| *G08G 1/16* | (2006.01) |
| *G01S 11/12* | (2006.01) |

(52) U.S. Cl.
CPC .............. *G06K 9/00791* (2013.01); *G01C 3/06* (2013.01); *G01S 11/12* (2013.01); *G06K 9/00805* (2013.01); *G06T 7/0042* (2013.01); *G08G 1/163* (2013.01); *G08G 1/164* (2013.01); *G06T 2207/30252* (2013.01)

(58) Field of Classification Search
CPC .................... G01C 3/06; G06T 7/0042; G06T 2207/30252; G08G 1/163; G08G 1/164; G01S 11/12; G06K 9/00805; G06K 9/00791
USPC .................. 348/148, 149, 143; 386/226, 323
See application file for complete search history.

(56) References Cited

U.S. PATENT DOCUMENTS 9,074,887 B2 * 7/2015 Hsieh .................... G06T 7/0042

FOREIGN PATENT DOCUMENTS

| DE | 10 2006 005 512 A1 | 8/2006 |
|---|---|---|
| DE | 10 2007 048 809 A1 | 7/2008 |
| DE | 10 2009 012 917 A1 | 9/2009 |
| DE | 10 2008 042 631 A1 | 4/2010 |
| EP | 2 416 115 A1 | 8/2012 |
| WO | WO 2008/080951 A1 | 7/2008 |
| WO | WO 2010/007392 A1 | 1/2010 |

OTHER PUBLICATIONS

PCT International Search Report Jul. 5, 2012.

* cited by examiner

*Primary Examiner* — Robert Chevalier
(74) *Attorney, Agent, or Firm* — Brinks Gilson & Lione

(57) ABSTRACT

The invention relates to a distance-determining method by means of a camera sensor, wherein a distance between the camera sensor and a target object is determined on the basis of camera information, which method is defined by the fact that the camera information comprises a spatial extent of the region covered by the target object on a light sensor in the camera sensor.

18 Claims, 2 Drawing Sheets

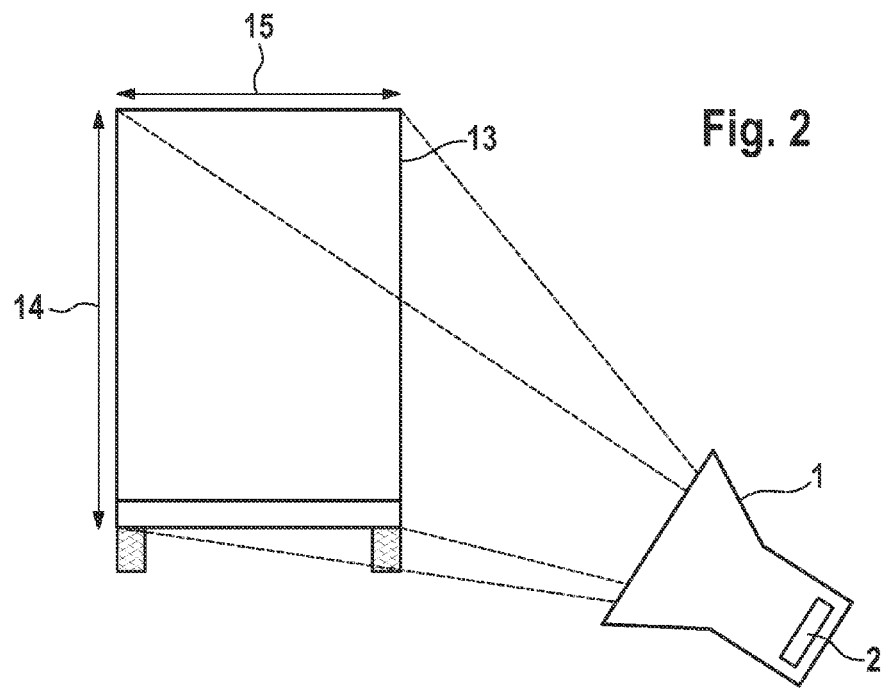
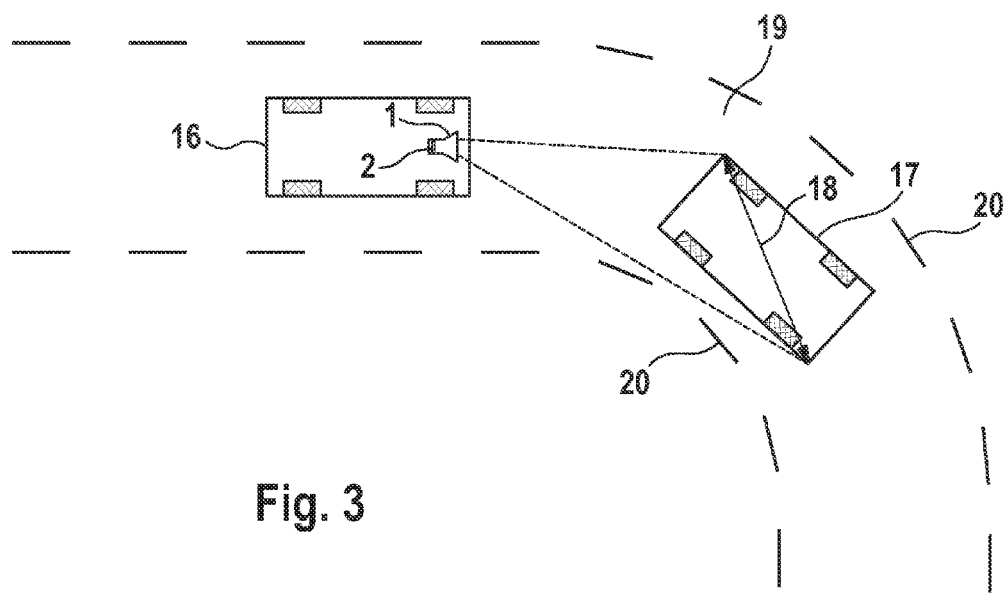

DISTANCE MEASUREMENT BY MEANS OF A CAMERA SENSOR

CROSS REFERENCE TO RELATED APPLICATIONS

This application claims priority to German Patent Application No. 10 2011 075 674.4, filed May 11, 2011 and PCT/EP2012/058354, filed May 7, 2012.

FIELD OF THE INVENTION

The invention relates to a distance determination method by means of a camera sensor and to a distance determination system.

BACKGROUND

The prior art already discloses various sensor systems for capturing surroundings and particularly for measuring distance to a target object. In this connection, WO 2008/080951 discloses a driver assistance system that uses a radar or lidar sensor, for example, to ascertain a distance to a vehicle traveling in front. In order to ensure that the distance sensors are oriented in the direction of the vehicle traveling in front despite roadway irregularities and resultant angles of inclination for the driver's own vehicle, a camera is provided that recognizes the vehicle traveling in front and matches the orientation of the distance sensors to the respective situation. However, an exact orientation for the distance sensors is possible only when the camera and the distance sensor are mounted at the same height in the vehicle or else by means of triangulation, provided that the distance of the camera from the vehicle traveling in front is known. For this reason, WO 2008/080951 involves the distance from the camera to the vehicle traveling in front being estimated from the camera image. The requirement of precision of the distance determination must only be low in this case, however.

DE 10 2007 048 809 A1 describes a method and an apparatus for recognizing concealed objects in road traffic. In this case, a position determination system uses various sensors, such as GPS module, radar sensor, lidar sensor or stereo camera, to ascertain the position of its own vehicle and the positions of adjacent vehicles. The use of a stereo camera allows both object recognition and comparatively exact distance measurement without the use of additional distance sensors. In addition, a vehicle-to-vehicle communication system is disclosed that transmits the surroundings data captured by its own vehicle to adjacent vehicles, as a result of which the latter are able to sense objects that they themselves are unable to see. For each transmitted object, there are a number of attributes that are either determined by means of the sensor system or are retrieved from a lookup table. Furthermore, the vehicle-to-vehicle communication system transmits vehicle parameters from its own vehicle, such as the vehicle length, the vehicle width and the vehicle type.

The disadvantage of these apparatus and methods that are known from the prior art is that precise distance measurement always requires dedicated sensors such as radar sensors, lidar sensors or a stereo camera. These sensors are associated with additional cost outlay, however. Provided that distance determination based on the prior art is carried out by means of the comparison of GPS position data, the ascertained distance is only very imprecise, since the global navigation satellite systems used for position determination are always subject to a certain amount of local tolerance. The use of a mono camera for estimating a distance also delivers only very imprecise data that are unsuitable for safety-relevant applications, such as brake interventions.

It is therefore the object of the present invention to propose a method and a system that allow reliable and essentially exact distance measurement to a target object without the use of separate distance sensors.

The invention achieves this object by means of the distance determination method and the distance determination system and described herein.

SUMMARY AND INTRODUCTORY DESCRIPTION OF THE INVENTION

The inventive distance determination method uses a camera sensor, according to which a piece of camera information is taken as the basis for determining a distance from the camera sensor to a target object, is distinguished in that the camera information includes a physical extent of the region covered by the target object on a photo sensor in the camera sensor. The advantage of this method is that the distance determination involves resorting to a piece of information that is captured directly by the camera, namely the physical extent of the object on the photo sensor. Therefore, a separate distance sensor such as a radar sensor or lidar sensor is not required. Since a large number of current vehicles are equipped with a camera sensor anyway, the inventive method for distance determination allows a large number of driver assistance systems, such as intelligent speed and distance control, to be implemented without additional cost and manufacturing outlay.

Preferably, the camera information that includes the physical extent of the region covered by the target object on a photo sensor in the camera sensor is logically combined with a piece of information about the actual physical extent of the target object. The logical combination of the extent on the photo sensor with a piece of information about the actual extent allows the distance from the camera sensor to the target object to be calculated easily by means of geometric relationships.

In addition, it is preferred that the camera sensor is a mono camera sensor. Since the inventive distance determination requires exclusively a piece of camera information about the physical extent on the photo sensor, there is no need for a second camera, as in a stereo camera sensor. Inherently known but comparatively awkward distance determination by means of the alignment of the images of two single cameras as in a stereo camera sensor is therefore avoided. The use of a mono camera sensor instead of a stereo camera sensor also reduces the manufacturing outlay and hence the production costs.

According to a further preferred embodiment of the invention, the camera sensor is a stereo camera sensor. The inventive method can also be carried out without additional outlay in a stereo camera sensor. By way of example, it is thus conceivable for an inherently known method for distance determination to be carried out by means of the stereo camera sensor and validated by means of the inventive method, and vice versa.

According to a further preferred embodiment of the invention, the camera information includes the physical extent of the region covered by the target object on the photo sensor in the camera sensor along a horizontal. The distance determination is therefore carried out over the width of the target object, which entails the advantage that usually, provided that the target object is a car, for example, the largest expanse that can be captured in the direction of travel is used for distance determination. The relative imprecision that inevitably accompanies any measurement of a physical variable is therefore particularly low.

Furthermore, it is advantageous that the camera information includes the physical extent of the region covered by the target object on the photo sensor in the camera sensor along a vertical. In this case, the distance determination is additionally or alternatively carried out using the height of the target object. Provided that the target object is a truck, the physical height of which is usually larger than its physical width, it is therefore possible to carry out even more precise distance determination.

In addition, it is preferred that the camera information includes an area of the region covered by the target object on the photo sensor in the camera sensor. The area covered on the photo sensor is usually easy to determine, for example by counting the sensor cells covered in the case of a CCD sensor. The area covered delivers an additional piece of information about the target object that, by way of example, allows the distance determined by means of the width of the target object and/or the height of the target object to be checked. It is therefore possible to capture and validate the distance information using one and the same sensor.

In a further preferred embodiment of the invention, the information about the actual physical extent of the target object includes the physical extent along the horizontal and/or along the vertical and/or the cross-sectional area of the target object. As already described, the logical combination of the information about the extents of the regions covered in the camera sensor with the actual physical extents of the target object by means of geometric relationships allows the distance between camera sensor and target object to be easily determined. The more data available about actual physical extents and the more physical extents of the area covered on the photo sensor that are used for distance determination, the more precisely and reliably the inventive method can be carried out.

In addition, it is advantageous that the photo sensor is a CCD (Charge Coupled Device) sensor chip or a CMOS (Complementary Metal Oxide Semiconductor) sensor chip. It therefore becomes a simple matter, without additional outlay, to read the photo sensor electronically. This is advantageous particularly in view of the electronic processing of the image information captured by the sensor.

In particular, it is advantageous that the camera information includes the number of detector rows covered by the target object on the CCD (Charge Coupled Device) sensor chip or the CMOS (Complementary Metal Oxide Semiconductor) sensor chip and/or the number of detector columns covered by the target object in the camera sensor on the photo sensor chip and/or the number of detector cells covered in total. In the case of a CCD sensor chip or a CMOS sensor chip, a measure of the width, the height and the area of the covered region can easily be captured by counting the detector columns, detector rows or the individual detector cells.

In a further preferred embodiment of the invention, the physical extents of the region covered by the target object on the photo sensor are used to form a ratio for the extents along the horizontal and the vertical and/or the total covered area. This allows the determination of characteristic extent ratios for various types of target objects and hence a further gain in information about the target object.

In a further particularly preferred embodiment of the invention, the ratio of the extents is used to allocate the target object to an object class. The allocation to an object class allows closer identification of the target object accompanied by the possibility of resorting to actual physical extents that are characteristic of this object class for calculating the distance, provided that they are not transmitted directly by the target object.

Preferably, the method is distinguished in that the object class classifies the target object as being associated with one or more of the following classes: vehicle make, vehicle model, pedestrian or cyclist. This allows essentially exact identification and classification of the target object and, linked thereto, essentially individual allocation to an object class. Therefore, it is possible to resort to essentially individual actual physical extents of the target object, provided that they are not transmitted directly by the target object.

In addition, it is advantageous that an additional piece of camera information includes a direction of movement of the target object relative to the camera sensor. Capture of the direction of movement relative to the camera sensor allows determination of the physical orientation of the target object relative to the camera sensor. The information about the physical orientation relative to the camera sensor affords the advantage that a width detected in the photo sensor when the orientation of target object and camera sensor are not identical can be calculated back to obtain the width when the orientation is identical. It is therefore possible for the coverage in the photo sensor that corresponds to the actual physical width to be ascertained even in a curve in which the target object, on account of its different position in the curve, has a different orientation than the subsequent vehicle with the camera sensor, for example.

In addition, it is preferred that an additional piece of information about the target object includes the direction of movement of the target object relative to the camera sensor and/or a piece of position information from the target object, wherein the position information is based particularly on a global navigation satellite system. In this case, the additional information can be transmitted directly from the target object to the vehicle determining the distance, for example. Therefore, the advantage is obtained that the orientation of the target object is known independently of the recognition of the direction of the movement of the target object by the camera sensor of the vehicle that determines the distance. This results in the already described advantage that a width detected in the photo sensor for the target object when the orientation of the target object and camera sensor is not identical can be calculated back to obtain the width when the orientation is identical. The position information about the target object can likewise be transmitted by the target object and allows the distance determined by means of the inventive method to be checked, with an exact check not being possible since the position determination by means of global navigation satellite systems is encumbered by comparatively high imprecision in comparison with the inventive method. It is nevertheless possible to recognize a distance that is determined in the region of several meters and therefore incorrectly in terms of relevance to safety.

Preferably, the information about the actual physical extent of the target object and/or the additional information about the target object is/are captured by means of vehicle-to-X communication. The advantage that results from this is that each target object can transmit an individual and therefore optimally matched data record of actual physical extents to the vehicle that determines the distance, which allows precise and reliable distance determination since the output data that are necessary for distance determination describe the target object exactly.

In a further particularly preferred embodiment of the invention, the vehicle-to-X communication exchanges information on the basis of at least one of the following types of connection:

WLAN connection, particularly according to IEEE 802.11,
ISM connection (Industrial, Scientific, Medical Band),
infrared link and
mobile radio link.

In this case, these types of connection afford different advantages and disadvantages, depending on the type in question and the wavelength. WLAN connections allow a high data transmission rate, for example. Data transmission around an obstacle is possible only to a limited extent, however. By contrast, although ISM connections afford a lower data transmission rate, they also allow data to be transmitted around a visual obstacle. Infrared links in turn afford a low data transmission rate that is also severely restricted when there is no visual link. Finally, mobile radio links are not impaired by visual obstacles and afford a good data transmission rate. Instead, setup of the link is comparatively slow. The combination and simultaneous or parallel use of a plurality of these types of connection result in further advantages, since in this way the disadvantages of individual types of connection can be compensated for.

Furthermore, it is advantageous that the distance determined by means of the camera information for a target object is made available to at least one driver assistance system. Hence, driver assistance systems that carry out brake interventions or adjust a distance from the vehicle traveling in front by taking over the engine control, for example, can be supplied with the distance information necessary for their execution without additional distance sensors. Similarly, it is also conceivable for the distance information to be made available to other driver assistance systems that output a warning to the driver if need be when there is a drop below a safety-critical minimum distance. This exemplary list of driver assistance systems is not complete and can be extended as desired, since the ascertained distance can be made available to any driver assistance system and any vehicle system.

Expediently, the information about the actual physical extent of the target object and/or the additional information about the target object is/are validated by means of a comparison with the camera information and/or the additional camera information. Therefore, the advantage obtained is that validation by means of the camera sensor can be performed prior to the processing of the information or additional information captured by means of vehicle-to-X communication, for example. Since the camera sensor is used for distance determination anyway according to the inventive method, it can be used for validation without the additional involvement of further sensors. Since no absolute actual extents can be measured on the photo sensor, it is possible to compare the ratio of the extents on the photo sensor with the ratio of the actual physical extents transmitted by the target object, for example. If the ratios of the extents match, the information about the actual physical extent of the target object is deemed to be validated. By contrast, the direction of movement of the target object relative to the camera sensor can be captured by the latter directly. Hence, it is advantageously also possible to validate the additional information about the target object.

Furthermore, it is advantageous that a target object recognition algorithm in the camera sensor lowers a recognition threshold when the target object has already been allocated to an object class by means of the information about the actual physical extent of the target object. This demonstrates a further advantage of the inventive method, since the information about the target object can be used to speed up the object recognition by the camera sensor. Hence, the result is capture of the surroundings by an appropriate driver assistance system in a manner that is sped up as a whole.

The present invention also relates to a distance determination system that determines a distance from a camera sensor to a target object and that carries out the inventive method for distance determination, in particular. The system includes a camera sensor and a vehicle-to-X communication device and/or an electronic memory device and is distinguished in that the camera sensor captures a piece of camera information that includes a physical extent of the region covered by the target object on a photo sensor in the camera sensor.

It is preferred that the electronic memory device stores an object class matrix that contains ratios of extents along the horizontal and the vertical and/or the total covered area for a multiplicity of different object classes. Hence, the inventive system has the option of using alignment of the ratios of the extents of the regions covered on the photo sensor with the ratios of extents that are stored on the electronic memory device in order to allocate a target object to an object class. The allocation to an object class is therefore independent of an object class that is possibly received by means of vehicle-to-X communication or of actual extents that are received by means of vehicle-to-X communication. The advantage obtained is that the distance determination can be carried out even when either the target object does not transmit information that is necessary for distance determination or the vehicle that determines the distance does not receive any corresponding information, for example because it does not have vehicle-to-X communication means.

BRIEF DESCRIPTION OF THE DRAWINGS

Further preferred embodiments arise from the descriptions that follow for exemplary embodiments with reference to figures, in which;

FIG. 2 shows a mono camera sensor that classifies the target object by using the ratio of its physical extents, and FIG. 3 shows a traffic situation in which the inventive distance determination method and distance determination system are used.

DETAILED DESCRIPTION

Figure 1A:
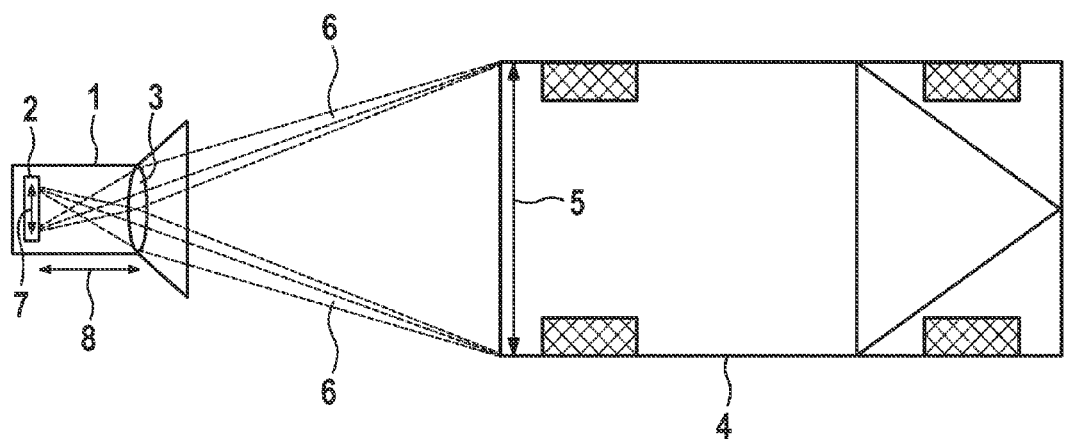
FIGS. 1a and 1b show a physical extent of the region covered by the target object on the photo sensor, the actual extent of the target object and the associated beam path.
Figure 1B:
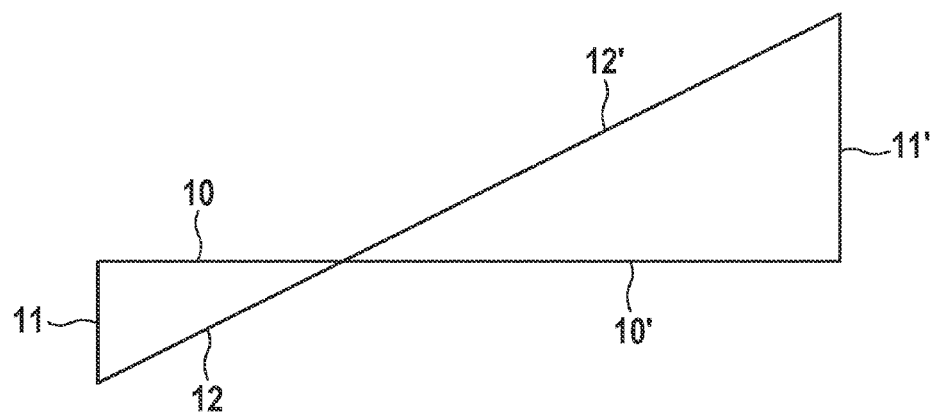

FIG. 1a shows an exemplary and schematic embodiment of the inventive method. What is depicted is camera sensor 1, which includes photo sensor 2 and optical lens 3. Photo sensor 2 and optical lens 3 are arranged at the distance 8 from one another. In the field of vision of camera sensor 1, there is vehicle 4. Vehicle 4 is oriented such that camera sensor 1 captures the rear view of vehicle 4. The rear view of vehicle 4 has a physical extent 5 in the horizontal direction, this corresponding to the vehicle width. Via beam path 6, an extent 7 is produced on photo sensor 2, said extent indicating the width of the region covered on photo sensor 2. According to the example, the physical extent 5 for vehicle 4 is known. The distance 8 and the extent 7 of the region covered by vehicle 4 on photo sensor 2 are likewise known or capturable. Hence, according to the example, a simple geometric relationship is used to ascertain the distance from vehicle 4 to camera sensor 1. The geometric relationship according to the example is shown in FIG. 1b. Length 10 corresponds to distance 8 in FIG. 1a, and length 10' corresponds to the distance between camera sensor 1 and vehicle 4. Length 11 corresponds to extent 7 on photo sensor 2 and length 11' corresponds to vehicle width 5. Lengths 12 and 12' correspond to beam path 6. The ratio of the lengths 10 to 10' and 11 to 11' is now used according to the example to determine distance 10' from camera sensor 1 to vehicle 4 (similar triangles rule).

FIG. 2 shows camera sensor 1 with photo sensor 2. In this exemplary embodiment, camera sensor 1 captures the rear view of vehicle 13. Physical extents 14 and 15 along the horizontal and the vertical directions are mapped onto photo sensor 2 in proportion. According to the example, the ratio of the extents 14 and 15 mapped onto photo sensor 2 in proportion is formed. From an object class matrix on an electronic memory, a ratio value is now sought that corresponds to the ratio value formed from extent 14 and extent 15. A match with the ratio value for a truck is obtained. Vehicle 13 is therefore recognized as a truck by camera sensor 1 on the basis of the ratio of the extents 14 and 15 from said vehicle.

The exemplary embodiment shown in FIG. 3 shows vehicle 16, which is following at a distance from vehicle 17 in roadway lane 19. According to the example, both vehicles have vehicle-to-X communication devices. Since roadway lane 19 has a curve, vehicles 16 and 17 are oriented in different directions. Camera sensor 1 captures physical extent 18 from vehicle 17. On account of the different orientations of the vehicles, however, extent 18 does not correspond to the width of vehicle 17 but rather corresponds to a diagonal from vehicle 17. By means of the vehicle-to-X communication devices, vehicle 16 receives the actual length and width of vehicle 17, inter alia. Distance ascertainment that is carried out solely on the basis of the actual extents of vehicle 17 and the region covered on photo sensor 2 would result in an incorrectly ascertained distance, since the region covered on photo sensor 2 does not correspond to the width of vehicle 17 but rather corresponds to the diagonal 18 therefrom. In order to avoid such errors during the inventive distance determination, according to the example vehicle 17 also transmits its direction of movement. By comparing the direction of movement of vehicle 17 with the separate direction of movement of vehicle 16, vehicle 16 now first of all determines the relative orientation of both vehicles in relation to one another in this exemplary embodiment. In light of the relative orientation, camera sensor 1 now calculates back captured diagonal 18 to obtain an extent that corresponds to the vehicle width of vehicle 17. The calculated-back extent allows the actual distance between vehicle 16 and vehicle 17 to be determined.

In an exemplary embodiment that is likewise shown in FIG. 3, the relative orientation of both vehicles and diagonal 18 captured by camera sensor 1 are used to calculate back to obtain the extent of the vehicle length on photo sensor 2. Hence, the distance between the two vehicles is—according to the example—determined by means of the length and not by means of the width of vehicle 17.

According to a further exemplary embodiment shown in FIG. 3, only vehicle 16 is provided with a vehicle-to-X communication device, but not vehicle 17. Vehicle 16 therefore receives neither information about the orientation of vehicle 17 nor information about the actual physical extents of vehicle 17. However, camera sensor 1 recognizes from roadway markings 20 that vehicle 17 is in a curve. According to the example, the relative orientation of vehicle 17 to vehicle 16 is determined by means of the orientation of roadway markings 20 by assuming that vehicle 17 follows lane 19. Furthermore, for vehicle 17, an average ratio of vehicle width to vehicle length is assumed in order to keep any error during the distance determination as small as possible on average. Hence, vehicle 16 has sufficient information available to be able to ascertain the distance to vehicle 17 by means of the region covered by diagonal 18 on photo sensor 2. As soon as both vehicles are traveling in the same direction again, that is to say have an identical orientation, camera sensor 1 can capture the vehicle width of vehicle 17 directly. Once the width of vehicle 17 has been captured, this information can be used in later curves for exact distance determination without having to resort to average values for ratios of vehicle widths to vehicle lengths.

While the above description constitutes the preferred embodiment of the present invention, it will be appreciated that the invention is susceptible to modification, variation, and change without departing from the proper scope and fair meaning of the accompanying claims.

The invention claimed is:

1. A distance determination method by means of a camera sensor, comprising the steps of:
   capturing a piece of camera information as a basis for determining a distance from the camera sensor to a target object, in that the camera information is related to a physical extent of a region covered by the target object on a photo sensor in the camera sensor;
   in that the camera information related to a physical extent of a region covered by the target object on a photo sensor in the camera sensor is logically combined with a further piece of information about the physical extent of the target object;
   in that the further piece of information related to the physical extent of the target object is in the form of at least one of the physical extent along the horizontal axis, the physical extent along the vertical axis, and the cross-sectional area of the target object; and
   in that the further piece of information about the target object comprises the direction of movement of the target object relative to the camera sensor.

2. The method as claimed in claim 1, further comprising in that the camera sensor is provided in the form of a mono camera sensor.

3. The method as claimed in claim 1 further comprising in that the camera sensor is provided in the form of a stereo camera sensor.

4. The method as claimed in claim 1 further comprising in that the camera information related to a physical extent of a region covered by the target object on the photo sensor is detected in the camera sensor along a horizontal axis.

5. The method as claimed in claim 1 further comprising in that the camera information related to a physical extent of a region covered by the target object on the photo sensor is detected in the camera sensor along a vertical axis.

6. The method as claimed in claim 1 further comprising in that the camera information related to a physical extent is an area of the region covered by the target object on the photo sensor in the camera sensor.

7. The method as claimed in claim 1 further comprising providing the photo sensor in the form of a CCD sensor chip or a CMOS sensor chip.

8. The method as claimed in claim 1 further comprising in that the physical extent of a region covered by the target object on the photo sensor is used to form a ratio for the extents along the horizontal axis and the vertical axis, or the total covered area.

9. The method as claimed in claim 8, further comprising in that the ratio of the extents is used to allocate the target object to an object class.

10. The method as claimed in claim 9, further comprising in that the object class classifies the target object as being associated with one or more of the object classes of: a vehicle make, a vehicle model, a pedestrian, or a cyclist.

11. A distance determination method by means of a camera sensor, comprising the steps of:
   capturing a piece of camera information as a basis for determining a distance from the camera sensor to a target object, in that the camera information is related to a physical extent of a region covered by the target object on a photo sensor in the camera sensor;
   in that the camera information related to a physical extent of a region covered by the target object on a photo sensor in the camera sensor is logically combined with a further piece of information about the physical extent of the target object; and
   in that the further piece of information about the target object is captured the direction of movement of the target object relative to the camera sensor, or a piece of position information from the target object, wherein the position information is based on a global navigation satellite system.

12. The method as claimed in claim 1 further comprising in that the further piece of information about the physical extent of the target object is captured by means of vehicle-to-X communication.

13. The method as claimed in claim 12, further comprising in that the vehicle-to-X communication exchanges information on the basis of at least one of the following types of connection:
   a WLAN connection according to IEEE 802.11,
   an ISM connection,
   an infrared link, and
   a mobile radio link.

14. The method as claimed in claim 1 further comprising in that the determining a distance is made available to at least one driver assistance system.

15. The method as claimed in claim 1 further comprising in that further information about the actual physical extent of the target object or additional information about the target object is validated by means of a comparison with the camera information or the additional information.

16. The method as claimed in claim 10 further comprising in that a target object recognition algorithm in the camera sensor lowers a recognition threshold when the target object has already been allocated to an object class by means of the information about the actual physical extent of the target object.

17. A distance determination system that determines a distance from a camera sensor to a target object comprising a camera sensor, a vehicle-to-X communication device, and an electronic memory device, wherein the camera sensor is configured to capture a piece of camera information that in the form of a physical extent of the region covered by the target object on a photo sensor in the camera sensor.

18. The system as claimed in claim 17, further comprising in that the electronic memory device stores an object class matrix that contains ratios of the physical extent along at least one of the horizontal direction, the vertical direction, and the total covered area for a multiplicity of different object classes.

* * * * *